C. C. BEALS.
DIMENSION INDICATOR AND MARKER.
APPLICATION FILED MAR. 2, 1920.
1,396,806.
Patented Nov. 15, 1921.
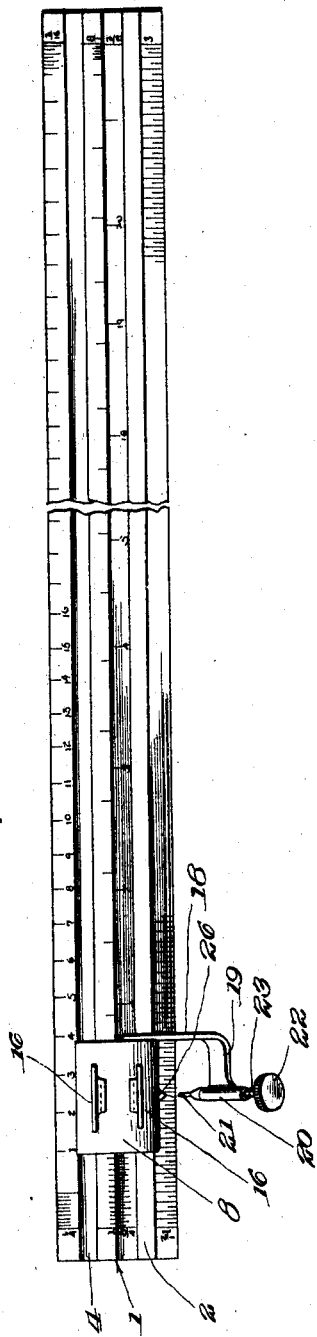
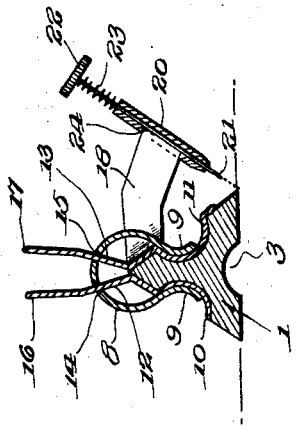
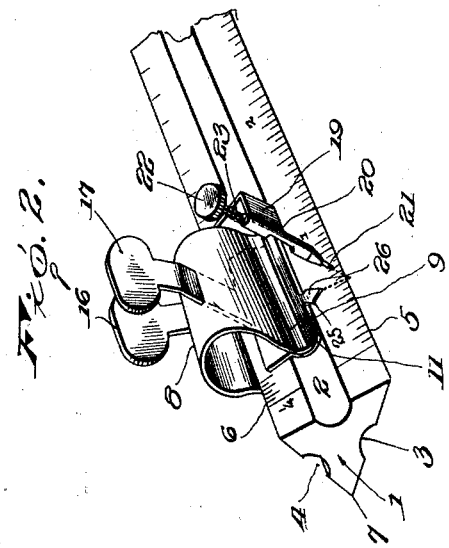
Inventor.
C. C. Beals,
by Lacey & Lacey, Attys.

UNITED STATES PATENT OFFICE.

CHARLES C. BEALS, OF ST. LOUIS, MISSOURI.

DIMENSION INDICATOR AND MARKER.

1,396,806.  Specification of Letters Patent.  Patented Nov. 15, 1921.

Application filed March 2, 1920. Serial No. 362,843.

*To all whom it may concern:*

Be it known that I, CHARLES C. BEALS, citizen of the United States, residing at St. Louis, in the county of St. Louis City and State of Missouri, have invented certain new and useful Improvements in Dimension Indicators and Markers, of which the following is a specification.

This invention relates to a dimension indicator for use on scales and for marking off selected dimensions on a piece of paper, or other surface.

In making accurate lay-outs it is essential that a draftsman should use a prick-needle for transferring or marking dimensions, inasmuch as the needle point makes a more accurate and smaller dimension mark than can be made with a pencil, and furthermore, does not become dull.

In using the usual needle provided for this purpose, such needle is independent of the scale and of the pencil and each time a dimension is laid off the draftsman must lay down his needle, use his pencil for making the line, and then pick up his needle again, all of which requires more or less time and is inconvenient and usually results in the draftsman marking off his dimensions with a pencil, thereby turning out a more or less inaccurate drawing.

The present invention resides in the provision of a marker associated with the scale in such manner that it may be moved therealong for setting off dimensions.

Also, the invention has as one of its objects the combination with a scale of a marker slidable therealong and having means which will indicate on the scale the dimension point selected and means which may be operated for pricking into the surface drawn upon the exact selected dimension point.

A further object of the invention is to provide a clip for attaching the marker in a slidable manner to any scale for use with any one of the graduated surfaces thereof.

In the drawings:

Figure 1 is a top plan view of the device as combined with a scale,

Fig. 2 is a view in perspective, of the scale and the device associated therewith, Fig. 3 is a transverse section centrally of the device, and showing its application to the scale.

In detail:

The invention, as herein illustrated, is applied to the usual triangular scale 1, having the longitudinal grooves 2, 3 and 4, dividing the scale peaks 5, 6 and 7.

The indicating member comprises a substantially cylindrical spring 8 having the reversely curved edges 9 which bear on shoes 10 and 11 shaped to conform to the configuration of the grooves on the scale; said shoes 10 and 11 are provided with shanks 12 and 13 extended through slits 14 and 15 respectively and terminating in finger pieces 16 and 17, thereby forming a clip which slidably engages in the grooves of the scale 1.

The shoe 11 carries a lateral extension 18 having a terminus 19 at right angles thereto and provided at its end with a guide bearing 20 angularly disposed and receiving a needle 21 having a button top 22 and normally pressed to an elevated position by a spring 23, so that its stop 24 is in the uppermost position and said needle 21 is out of contact with the surface on which the scale rests.

The shoe 11 carries an indicating member 25 having a point 26 which is adapted to indicate the various graduations of the scale selectively as the device is moved along the scale. The guide 20 for the needle is disposed directly in front of the indicator 25 and in such relation thereto that a vertical plane cutting the point 26 of the indicator would also cut the line of movement of the needle point 21. The needle point 21, by pressure on the button 22, may be projected downwardly adjacent the scale edge as clearly shown in Fig. 3, so as to prick into the paper or other surface on which the scale is resting, the exact point set off on the scale by the indicator 25.

I claim:

1. A dimension indicator comprising in combination with a scale, a clip member slidable thereon and carrying means for marking off dimensions from the scale, said clip member including a pair of shoes engaging the scale and conforming to the configuration of the scale in transverse section, and a spring member compressing said shoes into engagement with the scale.

2. A dimension indicator comprising in combination with a scale, a clip member slidable thereon, said clip member including a pair of shoes engaging the scale and conforming to the configuration of the scale in transverse section, a spring member compressing said shoes into engagement with the scale, and an extension carried by one of the shoe members and having marker means incorporated therein for setting off dimensions from the scale onto the surface on which the scale rests.

3. The combination with a scale, of a pair of shoes slidably engaging the scale and having finger-pieces projecting above the same, a substantially cylindrical spring fitting upon said finger-pieces and having its side edges bearing upon the shoes and holding them in engagement with the scale, one of said shoes having an indicator coöperating with the scale, and a marker carried by said shoe in the vertical plane of the indicator.

4. The combination with a scale, of a shoe slidably fitted thereon, a spring bearing on the shoe and bridging the scale for maintaining the engagement of the shoe with the scale, a lateral extension at one end of the shoe having a terminus disposed in front of the shoe and spaced therefrom, and a marker mounted on said terminus.

In testimony whereof I affix my signature.

CHARLES C. BEALS. [L. S.]